US011424862B2

(12) United States Patent
Xu et al.

(10) Patent No.: US 11,424,862 B2
(45) Date of Patent: Aug. 23, 2022

(54) DATA RETRANSMISSION METHOD AND DEVICE, DATA RESPONSE METHOD AND DEVICE, AND STORAGE MEDIUM

(71) Applicant: SPREADTRUM COMMUNICATIONS (SHANGHAI) CO., LTD., Shanghai (CN)

(72) Inventors: Yanchao Xu, Shanghai (CN); Yuhren Jauh, Shanghai (CN); Chinghwa Yu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/766,367

(22) PCT Filed: Mar. 4, 2020

(86) PCT No.: PCT/CN2020/077691
§ 371 (c)(1),
(2) Date: May 22, 2020

(87) PCT Pub. No.: WO2021/042686
PCT Pub. Date: Mar. 11, 2021

(65) Prior Publication Data
US 2021/0409156 A1    Dec. 30, 2021

(30) Foreign Application Priority Data

Sep. 6, 2019   (CN) .......................... 201910842314.9

(51) Int. Cl.
*H04L 5/00*    (2006.01)
*H04L 1/08*    (2006.01)
(52) U.S. Cl.
CPC .............. *H04L 1/08* (2013.01); *H04L 5/0055* (2013.01)

(58) Field of Classification Search
CPC ................................ H04L 1/08; H04L 5/0055
See application file for complete search history.

(56) References Cited

U.S. PATENT DOCUMENTS

RE43,151 E *   1/2012   Fischer ............... H04L 1/1858
                                                       455/452.2
2007/0011554 A1    1/2007   Trainin et al.
(Continued)

FOREIGN PATENT DOCUMENTS

CN    102215091 A    10/2011
CN    102724029 A    10/2012
(Continued)

OTHER PUBLICATIONS

CNIPA First Office Action for corresponding CN Patent Application No. 2019108423143.9; dated Jun. 1, 2020.
(Continued)

*Primary Examiner* — Edan Orgad
*Assistant Examiner* — Malick A Sohrab
(74) *Attorney, Agent, or Firm* — Cantor Colburn LLP (57) ABSTRACT

Data retransmission method and device, data response method and device, and a storage medium are provided. The data retransmission method includes: receiving acknowledgement frames on a plurality of links, wherein each of the acknowledgement frames includes reception information of AMPDUs belonging to a same block acknowledgement agreement at a transmission time of the acknowledgement frames on the plurality of links; if the acknowledgement frame is not successfully received on a first link, detecting whether the acknowledgement frame is successfully received on other links, and determining whether to retransmit based on the reception information in the acknowledgement frame successfully received on the other links; and if it is determined to retransmit, determining MPDUs to be retransmitted based on the reception information in the (Continued)

acknowledgement frame successfully received on the other links, and retransmitting the MPDUs to be retransmitted on any one of the plurality of links. Transmission efficiency may be improved.

10 Claims, 5 Drawing Sheets

(56) References Cited

U.S. PATENT DOCUMENTS

| | | | |
|---|---|---|---|
| 2007/0230373 A1* | 10/2007 | Li | H04B 7/0626 370/267 |
| 2011/0243073 A1 | 10/2011 | Gong et al. | |
| 2016/0182205 A1 | 6/2016 | Asterjadhi et al. | |
| 2016/0226635 A1 | 8/2016 | Chu et al. | |
| 2016/0330007 A1 | 11/2016 | Cherian et al. | |
| 2017/0373813 A1 | 12/2017 | Asterjadhi et al. | |
| 2018/0092115 A1* | 3/2018 | Krasnyanskiy | H04L 1/1685 |
| 2018/0205502 A1* | 7/2018 | Merlin | H04W 40/02 |
| 2019/0319738 A1 | 10/2019 | Ahn et al. | |
| 2019/0335454 A1* | 10/2019 | Huang | H04L 41/0893 |
| 2022/0014311 A1* | 1/2022 | Chitrakar | H04W 72/1273 |

FOREIGN PATENT DOCUMENTS

| | | |
|---|---|---|
| CN | 105846978 A | 8/2016 |
| CN | 107113111 A | 8/2017 |
| CN | 107534524 A | 1/2018 |
| CN | 109417546 A | 3/2019 |
| CN | 109672512 A | 4/2019 |
| CN | 110089148 A | 8/2019 |
| CN | 110572244 A | 12/2019 |
| WO | 2016163639 A1 | 10/2016 |
| WO | 2018136522 A1 | 7/2018 |
| WO | 2019050294 A1 | 3/2019 |

OTHER PUBLICATIONS

International Search Report for International Application No. PCT/CN2020/077691; dated Jun. 4, 2020.

3rd Generation Partnership Project, ERICSSON, "On CWS adjustment based on HARQ-ACK feedback"; 3GPP TSG RAN WG1 #82; 9 pages, dated (Oct. 5-9, 2015) R1-156034.

Liu et al., "Enhanced BlockACK method for A-MPDU transmission in IEEE 802.11n/ac/ad WLANs", Electronics Letters, vol. 52, No. 2; 2 pages, dated (Oct. 2015), doi: 10.1049/el.2015.3453.

* cited by examiner acknowledgement frames are received from a receiver on a plurality of links, wherein each of the acknowledgement frames includes reception information of AMPDUs belonging to a same block acknowledgement agreement at a transmission time of the acknowledgement frames on the plurality of links ⟶ S101 if the acknowledgement frame is not successfully received on a first link, whether the acknowledgement frame is successfully received on other links except the first link is detected, and whether to retransmit is determined based on the reception information in the acknowledgement frame successfully received on the other links ⟶ S102 if it is determined to retransmit, MPDUs to be retransmitted is determined based on the reception information in the acknowledgement frame successfully received on the other links, and the MPDUs to be retransmitted are retransmitted on any one of the plurality of links ⟶ S103

FIG. 3 when acknowledgement frames need to be transmitted on a plurality of links, reception information of AMPDUs belonging to a same block acknowledgement agreement at a transmission time of the acknowledgement frames on the plurality of links is determined ⎯ S401 the acknowledgement frames are transmitted on the plurality of links at the transmission time, wherein each of the acknowledgement frames includes the reception information, so that if the acknowledgement frame is not successfully received on a first link, a transmitter is capable of detecting whether the acknowledgement frame is successfully received on other links except the first link, determines whether to retransmit based on the reception information in the acknowledgement frame successfully received on the other links, and if it is determined to retransmit, determines MPDUs to be retransmitted based on the reception information in the acknowledgement frame successfully received on the other links, and retransmits the MPDUs to be retransmitted on any one of the plurality of links ⎯ S402

DATA RETRANSMISSION METHOD AND DEVICE, DATA RESPONSE METHOD AND DEVICE, AND STORAGE MEDIUM

CROSS-REFERENCE TO RELATED APPLICATIONS

This application is the national phase of International Application No. PCT/CN2020/077691, filed Mar. 4, 2020, which claims the benefit of priority to Chinese Patent Application No. 201910842314.9, filed on Sep. 6, 2019, and entitled "DATA RETRANSMISSION METHOD AND DEVICE, DATA RESPONSE METHOD AND DEVICE, AND STORAGE MEDIUM", the entire disclosure of which is incorporated herein by reference.

TECHNICAL FIELD

The present disclosure generally relates to communication technology field, and more particularly, to data retransmission method and device, data response method and device, and a storage medium.

BACKGROUND

In conventional Wireless Fidelity (Wi-Fi) systems, there is only one Media Access Control (MAC) layer and one Port Physical Layer (PHY) (including Radio Frequency (RF)). For typical WiFi systems that support dual bands (2.4 GHz and 5 GHz), merely one RF is generally enabled to receive data. This is an example of a single-link Wireless Local Area Network (WLAN) system. With the advancement of a WLAN standard, features of multi-bands (2.4 GHz, 5 GHz and 60 GHz) or multi-links have been discussed in IEEE 802.11 be (EHT) and RTA TIG. Therefore, in practice, more and more MILAN products (e.g., products that support multi-band multi-parallel features) support multi-links.

A multi-link system architecture has been proposed in which MAC protocol data units (MPDUs) can be received using all allowed links, which is advantageous to reduce latency and better utilize each link dynamically, thereby improving MPDU exchange efficiency. Further, to improve peak throughput, MPDU packets under an Aggregated MPDU (A-MPDU) Block Acknowledgement (Ack) Agreement belonging to a same Traffic Identifier (TID) may be transmitted over any link. For A-MPDU Block Ack Agreement in the case of using an immediate Block Acknowledgement (BA), on either link, in a Short Inter-Frame Space (SIFS) after the end of AMPDU transmission, an acknowledgment frame reply is expected, to indicate a reception status of each sub-MPDU in the AMPDU.

Existing retransmission mechanisms and reply response BA frame mechanisms of A-MPDUs are based on the IEEE 802.11 standard protocol. In traditional IEEE 802.11, a receiver replies a BA frame merely based on the reception status of an A-MPDU received on a current link, and the BA frame carries merely reception information of MPDU on the current link. A transmitter, under an immediate BA agreement, waits to receive a corresponding BA frame within AckTimeout time after transmitting the A-MPDU, and if the corresponding BA frame is not received within the AckTimeout time, the corresponding A-MPDU needs to be retransmitted. Still in the traditional IEEE 802.11, the transmitter, under a delayed BA agreement, waits to receive a corresponding BA frame within AckTimeout time of transmitting a Block Ack Request (BAR) after transmitting the AMPDU, and if the corresponding BA frame is not received within the AckTimeout time, the corresponding BAR or A-MPDU needs to be retransmitted.

However, under a multi-link system, when the transmitter transmits A-MPDUs belonging to the same A-MPDU BlockAck Agreement on a plurality of links, the receiver replies a responded BA frame on any link, and the transmitter determines whether to perform retransmission merely based on whether the BA frame is correctly received on a single link. If actually the receiver correctly receives on a certain link all or part of the MPDUs, and the responded BA frame also carries the corresponding MPDU reception status, but the BA frame is not correctly received by the transmitter, the transmitter may determine that the whole A-MPDUs have not been successfully transmitted and then retransmits the whole A-MPDUs, which reduces data transmission efficiency.

SUMMARY

Embodiments of the present disclosure provide a retransmission mechanism specially for occurrence of receiving failure of a block acknowledgement frame under an A-MPDU block acknowledgement agreement in a multi-link system, which may improve transmission efficiency.

In an embodiment of the present disclosure, a data retransmission method is provided, including: receiving from a receiver acknowledgement frames on a plurality of links, wherein each of the acknowledgement frames includes reception information of AMPDUs belonging to a same block acknowledgement agreement at a transmission time of the acknowledgement frames on the plurality of links; if the acknowledgement frame is not successfully received on a first link, detecting whether the acknowledgement frame is successfully received on other links except the first link, and determining whether to retransmit based on the reception information in the acknowledgement frame successfully received on the other links; and if it is determined to retransmit, determining MPDUs to be retransmitted based on the reception information in the acknowledgement frame successfully received on the other links, and retransmitting the MPDUs to be retransmitted on any one of the plurality of links.

Optionally, detecting whether the acknowledgement frame is successfully received on other links except the first link includes: detecting whether the acknowledgement frame is successfully received on the other links at an acknowledgement timeout time of the first link; or detecting whether the acknowledgement frame is successfully received on the other links at the time of a preset offset before the time when the first link accesses a channel next time.

Optionally, the preset offset includes a predetermined number of time slots.

Optionally, determining whether to retransmit based on the reception information in the acknowledgement frame successfully received on the other links includes: if the reception information in the acknowledgement frame successfully received on the other links indicates that the AMPDUs on the first link have been successfully received by the receiver, determining not to retransmit.

Optionally, the reception information indicates whether the AMPDUs have been received by the receiver, and determining MPDUs to be retransmitted based on the reception information in the acknowledgement frame successfully received on the other links includes: determining the AMPDUs which have not been successfully received by the receiver, based on the reception information in the acknowledgement frame successfully received on the other links, as the MPDUs to be retransmitted.

Optionally, the acknowledgement frame is a block acknowledgement frame under either an immediate BA agreement or a delayed BA agreement.

In an embodiment of the present disclosure, a data response method is provided, including: when acknowledgement frames need to be transmitted on a plurality of links, determining reception information of AMPDUs belonging to a same block acknowledgement agreement at a transmission time of the acknowledgement frames on the plurality of links; and transmitting the acknowledgement frames on the plurality of links at the transmission time, wherein each of the acknowledgement frames includes the reception information, so that if the acknowledgement frame is not successfully received on a first link, a transmitter is capable of detecting whether the acknowledgement frame is successfully received on other links except the first link, determines whether to retransmit based on the reception information in the acknowledgement frame successfully received on the other links, and if it is determined to retransmit, determines MPDUs to be retransmitted based on the reception information in the acknowledgement frame successfully received on the other links, and retransmits the MPDUs to be retransmitted on any one of the plurality of links.

Optionally, the reception information includes a reception status which indicates that the AMPDUs are completely received on the plurality of links or a reception status which indicates that the AMPDUs are partially received on the plurality of links.

In an embodiment of the present disclosure, a data retransmission device is provided, including: an acknowledgement frame receiving circuitry configured to receive from a receiver acknowledgement frames on a plurality of links, wherein each of the acknowledgement frames includes reception information of AMPDUs belonging to a same block acknowledgement agreement at a transmission time of the acknowledgement frames on the plurality of links; a detecting circuitry configured to: if the acknowledgement frame is not successfully received on a first link, detect whether the acknowledgement frame is successfully received on other links except the first link, and determine whether to retransmit based on the reception information in the acknowledgement frame successfully received on the other links; and a retransmitting circuitry configured to: if it is determined to retransmit, determine MPDUs to be retransmitted based on the reception information in the acknowledgement frame successfully received on the other links, and retransmit the MPDUs to be retransmitted on any one of the plurality of links.

In an embodiment of the present disclosure, a data response device is provided, including: a reception information determining circuitry configured to: when acknowledgement frames need to be transmitted on a plurality of links, determine reception information of AMPDUs belonging to a same block acknowledgement agreement at a transmission time of the acknowledgement frames on the plurality of links; and an acknowledgement frame transmitting circuitry configured to transmit the acknowledgement frames on the plurality of links at the transmission time, wherein each of the acknowledgement frames includes the reception information, so that if the acknowledgement frame is not successfully received on a first link, a transmitter is capable of detecting whether the acknowledgement frame is successfully received on other links except the first link, determines whether to retransmit based on the reception information in the acknowledgement frame successfully received on the other links, and if it is determined to retransmit, determines MPDUs to be retransmitted based on the reception information in the acknowledgement frame successfully received on the other links, and retransmits the MPDUs to be retransmitted on any one of the plurality of links.

In an embodiment of the present disclosure, a storage medium having computer instructions stored therein is provided, wherein when the computer instructions are executed, the above data retransmission method or the above data response method is performed.

In an embodiment of the present disclosure, a device including a memory and a processor and applied in a transmitter is provided, wherein the memory has computer instructions stored therein, and when the processor executes the computer instructions, the above data retransmission method is performed.

In an embodiment of the present disclosure, a device including a memory and a processor and applied in a receiver is provided, wherein the memory has computer instructions stored therein, and when the processor executes the computer instructions, the above data response method is performed.

Embodiments of the present disclosure may provide following advantages. In embodiments of the present disclosure, the acknowledgement frame transmitted by the receiver includes reception information of AMPDUs belonging to a same block acknowledgement agreement at a transmission time of the acknowledgement frames on all the plurality of links. Therefore, if the acknowledgement frame is not successfully received by the transmitter on the first link, whether to retransmit and the MPDUs to be retransmitted can be determined based on the reception information in the acknowledgement frames successfully received on the other links, which ensures that the determined MPDUs to be retransmitted includes the AMPDUs needing to be retransmitted, thereby avoiding unnecessary data retransmission and improving transmission efficiency.

Further, whether the acknowledgement frame is successfully received on the other links is determined at an acknowledgement timeout time of the first link, or at the time of a preset offset before the time when the first link accesses a channel next time. In embodiments of the present disclosure, the transmitter may determine whether the acknowledgement frame is successfully received on the other links at a specific time point. The specific time point may be the acknowledgement timeout time of the first link, or the time of the preset offset before the time when the accesses the channel next time. In this way, the data retransmission mechanism is improved, and the MPDUs to be retransmitted is determined in time, which ensures timely retransmission and further improves the transmission efficiency.

DETAILED DESCRIPTION

As described in the background, under a multi-link system, when the transmitter transmits A-MPDUs belonging to the same A-MPDU BlockAck Agreement on a plurality of links, the receiver replies a responded BA frame on any link, and the transmitter determines whether to perform retransmission merely based on whether the BA frame is correctly received on a single link. If actually the receiver correctly receives on a certain link all or part of the MPDUs, and the responded BA frame also carries the corresponding MPDU reception status, but the BA frame is not correctly received by the transmitter, the transmitter may determine that the whole A-MPDUs have not been successfully transmitted and then retransmits the whole A-MPDUs, which reduces data transmission efficiency.

In embodiments of the present disclosure, the acknowledgement frame transmitted by the receiver includes reception information of AMPDUs belonging to a same block acknowledgement agreement at a transmission time of the acknowledgement frames on all the plurality of links. Therefore, if the acknowledgement frame is not successfully received by the transmitter on the first link, whether to retransmit and the MPDUs to be retransmitted can be determined based on the reception information in the acknowledgement frame successfully received on the other links, which ensures that the determined MPDUs to be retransmitted includes the AMPDUs needing to be retransmitted, thereby avoiding unnecessary data retransmission and improving transmission efficiency.

In order to clarify the object, characteristic and advantages of embodiments of the present disclosure, embodiments of present disclosure will be described clearly in detail in conjunction with accompanying drawings.

Figure 1:
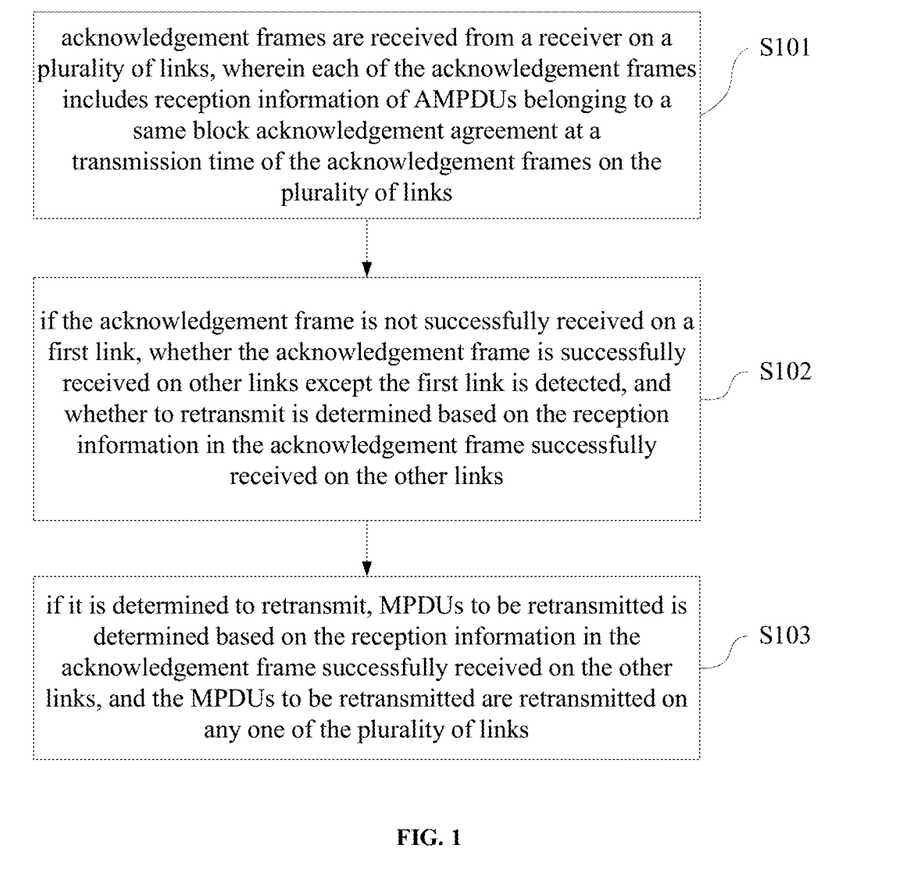
FIG. 1 is a flow chart of a data retransmission method according to an embodiment.

Referring to FIG. 1, FIG. 1 is a flow chart of a data retransmission method according to an embodiment.

The data retransmission method may be applied in a transmitter, that is, steps of the method shown in FIG. 1 may be performed by a device at the transmitter, such as a smart phone or a router.

The method includes S101, S102 and S103.

In S101, acknowledgement frames are received from a receiver on a plurality of links, wherein each of the acknowledgement frames includes reception information of AMPDUs belonging to a same block acknowledgement agreement at a transmission time of the acknowledgement frames on the plurality of links.

In S102, if the acknowledgement frame is not successfully received on a first link, whether the acknowledgement frame is successfully received on other links except the first link is detected, and whether to retransmit is determined based on the reception information in the acknowledgement frame successfully received on the other links.

In S103, if it is determined to retransmit, MPDUs to be retransmitted is determined based on the reception information in the acknowledgement frame successfully received on the other links, and the MPDUs to be retransmitted are retransmitted on any one of the plurality of links.

It should be noted that serial numbers of the steps in the embodiment do not represent limitations on an execution order of the steps.

In some embodiments, the acknowledgment frame may be a Block Acknowledgement (BA) frame.

In some embodiments, the transmitter and the receiver may be a terminal equipment such as a mobile phone, a computer or a tablet computer, or may be a relay equipment such as a router.

The transmitter may transmit to the receiver the AMPDUs on the plurality of links, and the receiver may receive the AMPDUs on the plurality of links, and transmit the acknowledgement frames indicating whether the AMPDUs have been successfully received on each link. Each acknowledgement frame transmitted by the receiver includes reception information of the AMPDUs belonging to the same block acknowledgement agreement at the transmission time of the acknowledgement frames on all the plurality of links.

Figure 2:
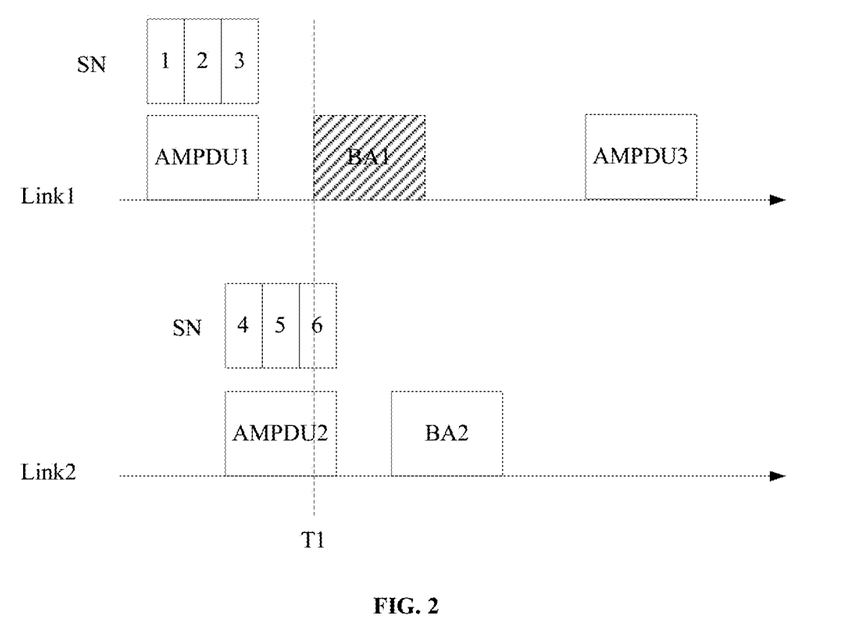
FIG. 2 is an application scenario diagram according to an embodiment.

Referring to FIG. 2, in a specific application scenario, the transmitter may transmit AMPDUs on a link Link1 and a link Link2. After the transmitter transmits the AMPDU1 including MPDUs with Sequence Numbers (SNs) of 1, 2 and 3 on the link Link1, the transmitter also transmits the AMPDU2 including MPDUs with sequence numbers of 4 and 5 on the link Link2. At the time T1, the receiver transmits on the link Link1 an acknowledgement frame BA1 which includes reception information of the MPDUs with the sequence numbers of 1, 2, 3, 4 and 5, i.e., including information of whether the MPDUs with the sequence numbers of 1, 2, 3, 4 and 5 have been successfully received. Similarly, the receiver transmits on the link Link2 an acknowledgement frame BA2 which includes reception information of the MPDUs with the sequence numbers of 1, 2, 3, 4, 5 and 6, i.e., including information of whether the MPDUs with the sequence numbers of 1, 2, 3, 4, 5 and 6 have been successfully received.

In some embodiments, in S101, the transmitter may receive the acknowledgement frame from the receiver on each of the plurality of links. The acknowledgement frame on each link may be successfully received by the transmitter, or may not be successfully received by the transmitter.

In some embodiments, in S102, if the transmitter does not successfully receive the acknowledgement frame on the first link, the transmitter may detect whether the acknowledgement frame is successfully received on other links. If the acknowledgement frame is successfully received on other links, whether to retransmit is determined based on the reception information in the acknowledgement frame successfully received on the other links.

If the reception information in the acknowledgement frame successfully received on the other links indicates that AMPDUs have not been successfully received by the receiver on the first link, it is determined that retransmission is required.

In some embodiments, in S103, when retransmission is determined, the MPDUs to be retransmitted are determined based on the reception information in the acknowledgement frame successfully received on the other links. The MPDUs to be retransmitted may include the AMPDUs which have not been successfully received by the receiver on the first link.

The transmitter may retransmit the MPDUs to be retransmitted on any one of the plurality of links.

In some embodiments, S102 may include: if the reception information in the acknowledgement frame successfully received on the other links indicates that the AMPDUs on the first link have been successfully received by the receiver, determining not to retransmit.

Still referring to FIG. 2, in a specific application scenario, if the transmitter does not successfully receive the acknowledgement frame BA1 on the link Link1, the transmitter may detect whether the acknowledgement frame BA2 is successfully received on the link Link2. If the transmitter successfully receives the acknowledgement frame BA2 and determines that the MPDUs with the sequence numbers of 1 and 2 on the link Link1 have been successfully received based on the reception information in the acknowledgement frame BA2, the transmitter determines to retransmit and merely retransmits the MPDU with the sequence number of 3 in the AMPDU1.

Alternatively, if the transmitter successfully receives the acknowledgement frame BA2 and determines that the receiver has successfully received all the AMPDUs on the link Link1 based on the reception information in the acknowledgement frame BA2, the transmitter determines that retransmission is not required.

In some embodiments, S102 may include: detecting whether the acknowledgement frame is successfully received on the other links at an acknowledgement timeout time of the first link; or detecting whether the acknowledgement frame is successfully received on the other links at the time of a preset offset before the time when the first link accesses a channel next time.

In embodiments of the present disclosure, the transmitter may determine whether the acknowledgement frame is successfully received on the other links at a specific time point. The specific time point may be the acknowledgement timeout time of the first link, or the time of the preset offset before the time when the first link accesses the channel next time.

In some embodiments, the transmitter sets a timer starting at a transmission end time of the transmitted AMPDUs. If the BA frame is not received within the duration of the timer, the transmitted AMPDUs are considered to fail to be transmitted. The acknowledgement timeout time refers to a time point when the time period ends.

In some embodiments, when the transmitter contends for a channel, a random backoff value is generated. When the backoff value decreases to 0, if channel detection is still idle, it is considered that the transmitter accesses the channel. The time when the backoff value decreases to 0 serves as the time of the transmitter accessing the channel.

Figure 3:
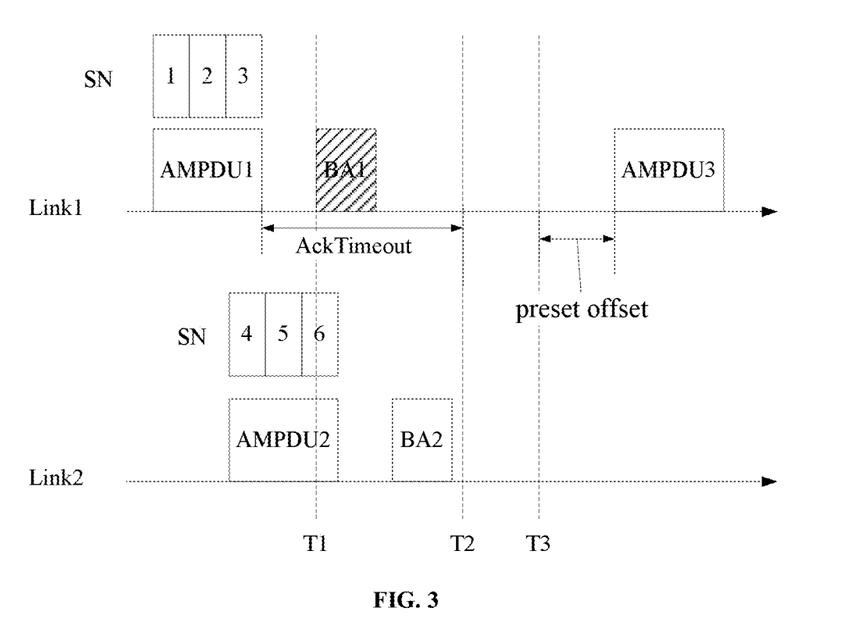
FIG. 3 is an application scenario diagram according to an embodiment.

Referring to FIG. 3, in a specific application scenario, the transmitter may detect whether the acknowledgement frame BA2 is successfully received on the link Link2 at the acknowledgement timeout time (AckTimeout, i.e., the time T2 shown in FIG. 3) after the AMPDU1 is transmitted on the link Link1. Alternatively, the transmitter may detect whether the acknowledgement frame BA2 is successfully received on the link Link2 at the time of the preset offset before the time when the link Link1 accesses a next channel resource, i.e., the time T3 of the preset offset before the time of starting to transmit the AMPDU3.

In some embodiments, the preset offset includes a predetermined number of time slots.

A specific value of the preset offset may be determined based on practical application scenario, which is not limited in embodiments of the present disclosure.

In some embodiments, the acknowledgement frame is a block acknowledgement frame under either an immediate BA agreement or a delayed BA agreement.

If the acknowledgement frame is under a delayed BA agreement, after transmitting the AMPDU, the transmitter needs to transmit a BAR, and waits to receive the corresponding BA frame within the AckTimeout time after transmitting the BAR.

If the acknowledgement frame is under an immediate BA agreement, the transmitter doesn't need to transmit a BAR to solicit the BA frame.

Figure 4:
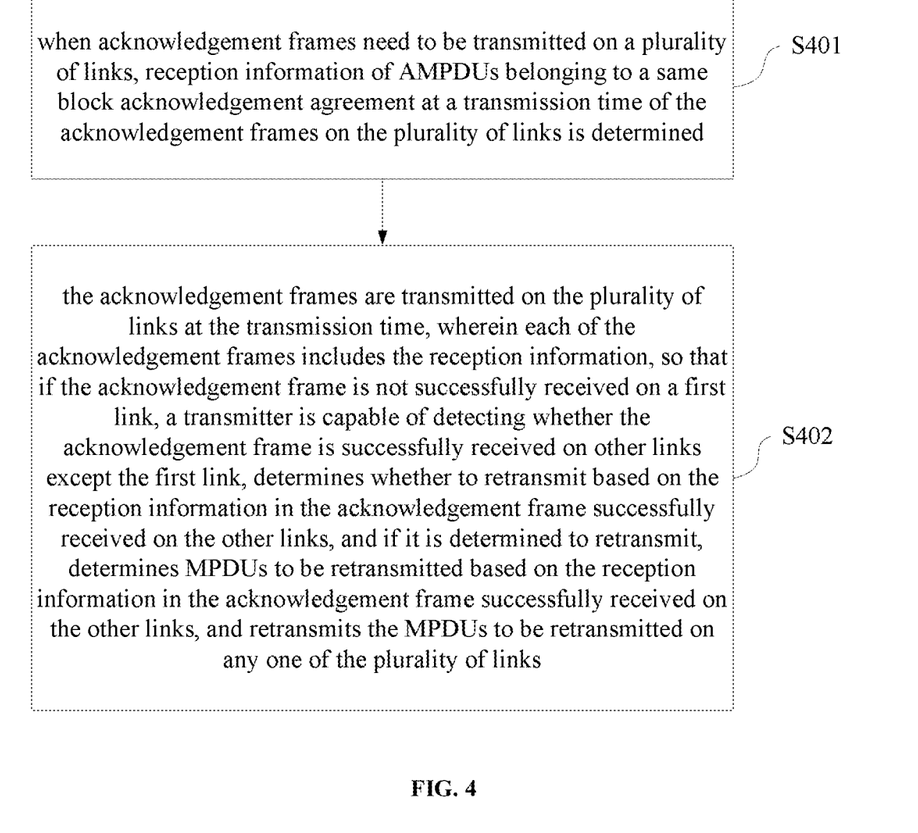
FIG. 4 is a flow chart of a data response method according to an embodiment.

FIG. 4 is a flow chart of a data response method according to an embodiment.

The data response method may be applied in a receiver, that is, steps of the method shown in FIG. 4 may be performed by a device at the receiver, such as a smart phone or a router.

The method includes S401 and S402.

In S401, when acknowledgement frames need to be transmitted on a plurality of links, reception information of AMPDUs belonging to a same block acknowledgement agreement at a transmission time of the acknowledgement frames on the plurality of links is determined.

In S402, the acknowledgement frames are transmitted on the plurality of links at the transmission time, wherein each of the acknowledgement frames includes the reception information, so that if the acknowledgement frame is not successfully received on a first link, a transmitter is capable of detecting whether the acknowledgement frame is successfully received on other links except the first link, determines whether to retransmit based on the reception information in the acknowledgement frame successfully received on the other links, and if it is determined to retransmit, determines MPDUs to be retransmitted based on the reception information in the acknowledgement frame successfully received on the other links, and retransmits the MPDUs to be retransmitted on any one of the plurality of links.

As the transmitter can transmit the AMPDUs to the receiver on the plurality of links and the receiver can receive the AMPDUs on the plurality of links, the receiver can know whether the AMPDUs are successfully received on each link. Therefore, the receiver may determine the reception information of the AMPDUs belonging to the same block acknowledgement agreement at the transmission time of the acknowledgement frames on the plurality of links, when the acknowledgement frames need to be transmitted on the plurality of links.

For different types of acknowledgement frames, transmission times of the acknowledgement frames are different. Specifically, if the acknowledgement frame is under a delayed BA agreement, a BAR needs to be transmitted after the transmitter transmits the AMPDUs, and the receiver transmits a BA frame within the AckTimeout time after the BAR is transmitted.

If the acknowledgement frame is under an immediate BA agreement, the transmitter doesn't need to transmit a BAR to solicit a BA frame.

In some embodiments, the reception information includes a reception status which indicates that the AMPDUs are completely received on the plurality of links or a reception status which indicates that the AMPDUs are partially received on the plurality of links.

Referring to FIG. 2, in a specific application scenario, the receiver transmits on the link Link1 an acknowledgement frame BA1 which includes reception information of MPDUs with sequence numbers of 1, 2, 3, 4 and 5, where the MPDUs with the sequence numbers of 4 and 5 are part of data of the AMPDU2 on the link Link2, and the acknowledgement frame BA1 indicates that the AMPDU2 on the link Link2 is partially received successfully. Besides, the receiver transmits on the link Link2 an acknowledgement frame BA2 which includes reception information of MPDUs with sequence numbers of 1, 2, 3, 4, 5 and 6. If the transmitter does not successfully receive the acknowledgement frame BA1 but successfully receives the acknowledgement frame BA2, the transmitter can determine based on the acknowledgement frame BA2 that the MPDU with the sequence number of 3 has not been successfully received on the link Link1, and then retransmits the MPDU with the sequence number of 3 in the AMPDU3 on the link Link1. Further, the AMPDU3 may only include the retransmitted MPDU with the sequence number of 3, or may include the retransmitted MPDU with the sequence number of 3 and data originally to be transmitted in the AMPDU3, such as MPDUs with sequence numbers of 7 and 8.

Figure 5:
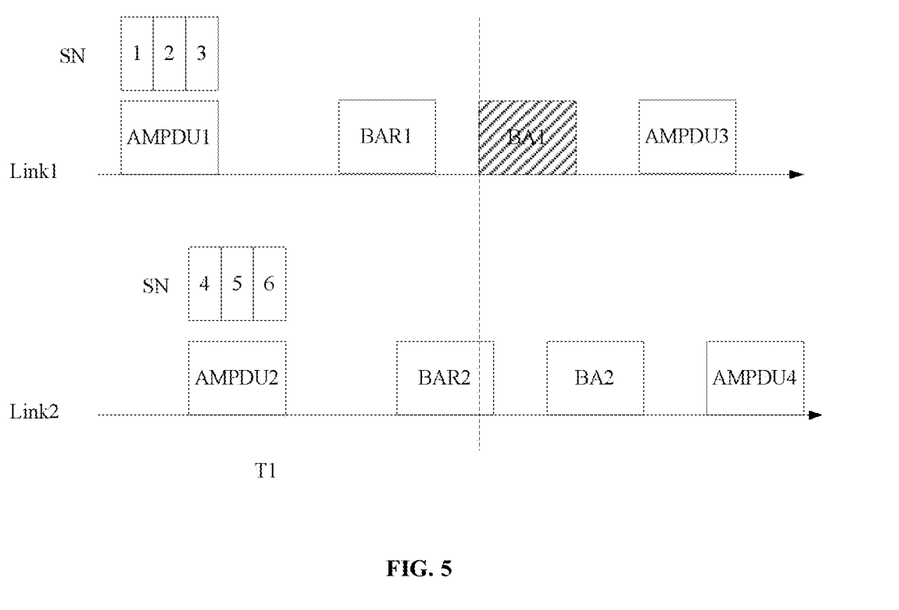
FIG. 5 is an application scenario diagram according to an embodiment.

Referring to FIG. 5, in another specific application scenario, a delayed BA agreement is set up between a transmitter and a receiver. After finishing transmitting an AMPDU1, the transmitter may transmit a BAR1, and the receiver transmits a BA1 acknowledgement frame within an AckTimeout time after the BAR1 is transmitted. At the time, the receiver has completely received the MPDUs with the sequence numbers of 1, 2, 3, 4 and 5, and thus the receiver transmits on the link Link1 the acknowledgement frame BA1 which includes reception information of MPDUs with the sequence numbers of 1, 2, 3, 4, 5. After finishing transmitting an AMPDU2, the transmitter may transmit a BAR2, and the receiver transmits a BA2 acknowledgement frame within an AckTimeout time after the BAR2 is transmitted. The acknowledgement frame BA2 transmitted by the receiver on the link Link2 includes reception information of MPDUs with the sequence numbers of 1, 2, 3, 4, 5 and 6, and indicates that AMPDUs on the links Link1 and Link2 are completely received successfully. When the transmitter does not successfully receive the acknowledgement frame BA1 but successfully receives the acknowledgement frame BA2, the transmitter can determine based on the acknowledgement frame BA2 that the receiver has successfully received the MPDUs with the sequence numbers of 1, 2 and 3, and then the transmitter can determine not to retransmit the MPDUs in the AMPDU1. That is, when AMPDU3 is subsequently transmitted on link Link1 and AMPDU4 is subsequently transmitted on link Link2, neither AMPDU3 nor AMPDU4 includes an MPDU in AMPDU1.

Figure 6:
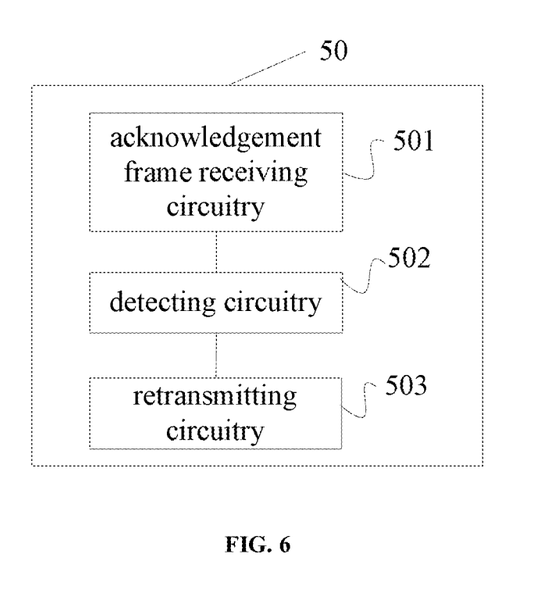
FIG. 6 is a structural diagram of a data retransmission device according to an embodiment.

Referring to FIG. 6, FIG. 6 is a structural diagram of a data retransmission device 50 according to an embodiment.

The data retransmission device 50 includes: an acknowledgement frame receiving circuitry 501 configured to receive from a receiver acknowledgement frames on a plurality of links, wherein each of the acknowledgement frames includes reception information of AMPDUs belonging to a same block acknowledgement agreement at a transmission time of the acknowledgement frames on the plurality of links; a detecting circuitry 502 configured to: if the acknowledgement frame is not successfully received on a first link, detect whether the acknowledgement frame is successfully received on other links except the first link, and determine whether to retransmit based on the reception information in the acknowledgement frame successfully received on the other links; and a retransmitting circuitry 503 configured to: if it is determined to retransmit, determine MPDUs to be retransmitted based on the reception information in the acknowledgement frame successfully received on the other links, and retransmit the MPDUs to be retransmitted on any one of the plurality of links.

In embodiments of the present disclosure, the acknowledgement frame transmitted by the receiver includes reception information of AMPDUs belonging to a same block acknowledgement agreement at a transmission time of the acknowledgement frames on all the plurality of links. Therefore, if the acknowledgement frame is not successfully received by the transmitter on the first link, whether to retransmit and the MPDUs to be retransmitted can be determined based on the reception information in the acknowledgement frame successfully received on the other links, which ensures that the determined MPDUs to be retransmitted includes the AMPDUs needing to be retransmitted, thereby avoiding unnecessary data retransmission and improving transmission efficiency.

More details of working principles and working modes of the data retransmission device 50 can be found in the above descriptions of FIG. 1 to FIG. 4, and are not described here.

Figure 7:
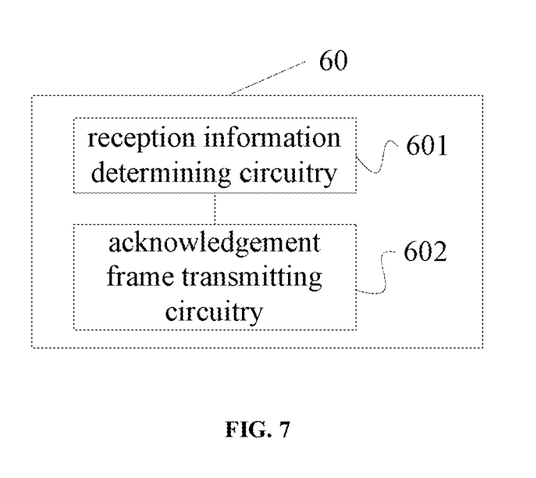
FIG. 7 is a structural diagram of a data response device according to an embodiment.

Referring to FIG. 7, FIG. 7 is a structural diagram of a data response device 60 according to an embodiment.

The data response device 60 includes: a reception information determining circuitry 601 configured to: when acknowledgement frames need to be transmitted on a plurality of links, determine reception information of AMPDUs belonging to a same block acknowledgement agreement at a transmission time of the acknowledgement frames on the plurality of links; and an acknowledgement frame transmitting circuitry 602 configured to transmit the acknowledgement frames on the plurality of links at the transmission time, wherein each of the acknowledgement frames includes the reception information, so that if the acknowledgement frame is not successfully received on a first link, a transmitter is capable of detecting whether the acknowledgement frame is successfully received on other links except the first link, determines whether to retransmit based on the reception information in the acknowledgement frame successfully received on the other links, and if it is determined to retransmit, determines MPDUs to be retransmitted based on the reception information in the acknowledgement frame successfully received on the other links, and retransmits the MPDUs to be retransmitted on any one of the plurality of links.

More details of working principles and working modes of the data response device 60 can be found in the above descriptions of FIG. 1 to FIG. 5, and are not described here.

In an embodiment of the present disclosure, a storage medium having computer instructions stored therein is provided, wherein when the computer instructions are executed, the above method as shown in FIG. 1 or FIG. 4 is performed. The storage medium may include a Read Only Memory (ROM), a Random Access Memory (RAM), a magnetic disk or an optical disk. The storage medium may include a non-volatile or non-transitory memory.

In an embodiment of the present disclosure, a device including a memory and a processor and applied in a transmitter is provided, wherein the memory has computer instructions stored therein, and when the processor executes the computer instructions, the above method as shown in FIG. 1 is performed. The device applied in the transmitter may include but not limited to a terminal equipment such as a mobile phone, a computer or a tablet computer, or a relay equipment such as a router.

In an embodiment of the present disclosure, a device including a memory and a processor and applied in a receiver is provided, wherein the memory has computer instructions stored therein, and when the processor executes the computer instructions, the above method as shown in FIG. 4 is performed. The device applied in the receiver may include but not limited to a terminal equipment such as a mobile phone, a computer or a tablet computer, or a relay equipment such as a router.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A data retransmission method, comprising:
receiving from a receiver an acknowledgement frame on each of a plurality of links, wherein the acknowledgement frame comprises reception information of Aggregated Media Access Control Protocol Data Units (AMPDUs) belonging to a same block acknowledgement agreement at a transmission time of the acknowledgement frame on the plurality of links;
based on the acknowledgement frame being not successfully received on a first link, detecting whether the acknowledgement frame is successfully received on at least one other link, and determining whether to retransmit Media Access Control Protocol Data Units (MPDUs) based on the reception information in the acknowledgement frame successfully received on the at least one other link, wherein the plurality of links comprise the first link and the at least one other link; and
based on determining to retransmit the MPDUs, determining the MPDUs to be retransmitted based on the reception information in the acknowledgement frame successfully received on the at least one other link, and retransmitting the MPDUs to be retransmitted on any one of the plurality of links.

2. The method according to claim 1, wherein detecting whether the acknowledgement frame is successfully received on at least one other link comprises:
detecting whether the acknowledgement frame is successfully received on the at least one other link at an acknowledgement timeout time of the first link; or
detecting whether the acknowledgement frame is successfully received on the at least one other link at the time of a preset offset before the time when the first link accesses a channel next time.

3. The method according to claim 2, wherein the preset offset comprises a predetermined number of time slots.

4. The method according to claim 1, wherein determining whether to retransmit MPDUs based on the reception information in the acknowledgement frame successfully received on the at least one other link comprises:
based on the reception information in the acknowledgement frame successfully received on the at least one other link indicating that the AMPDUs on the first link have been successfully received by the receiver, determining not to retransmit MPDUs.

5. The method according to claim 1, wherein the reception information indicates whether the AMPDUs have been received by the receiver, and determining the MPDUs to be retransmitted based on the reception information in the acknowledgement frame successfully received on the at least one other link comprises:
determining the AMPDUs which have not been successfully received by the receiver, based on the reception information in the acknowledgement frame successfully received on the at least one other link, as the MPDUs to be retransmitted.

6. The method according to claim 1, wherein the acknowledgement frame is a block acknowledgement frame under either an immediate block acknowledgement agreement or a delayed block acknowledgement agreement.

7. A device comprising a memory and a processor and applied in a transmitter, wherein the memory has computer instructions stored therein, and when the processor executes the computer instructions, the method according to claim 1 is performed.

8. A data response method, comprising:
based on an acknowledgement frame needing to be transmitted on each of a plurality of links, determining reception information of Aggregated Media Access Control Protocol Data Units (AMPDUs) belonging to a same block acknowledgement agreement at a transmission time of the acknowledgement frame on the plurality of links; and
transmitting the acknowledgement frame on each of the plurality of links at the transmission time,
wherein the acknowledgement frame comprises the reception information, so that based on the acknowledgement frame being not successfully received on a first link, a transmitter detects whether the acknowledgement frame is successfully received on at least one other link, determines whether to retransmit Media Access Control Protocol Data Units (MPDUs) based on the reception information in the acknowledgement frame successfully received on the at least one other link, and based on determining to retransmit the MPDUs, determines the MPDUs to be retransmitted based on the reception information in the acknowledgement frame successfully received on the at least one other link, and retransmits the MPDUs to be retransmitted on any one of the plurality of links, wherein the plurality of links comprise the first link and the at least one other link.

9. The method according to claim 8, wherein the reception information comprises a reception status which indicates that the AMPDUs are completely received on the plurality of links or a reception status which indicates that the AMPDUs are partially received on the plurality of links.

10. A device comprising a memory and a processor and applied in a receiver, wherein the memory has computer instructions stored therein, and when the processor executes the computer instructions, the method according to claim 8 is performed.

* * * * *